(12) United States Patent
Chin

(10) Patent No.: US 10,326,902 B2
(45) Date of Patent: Jun. 18, 2019

(54) IMAGE FORMING APPARATUS

(71) Applicant: KYOCERA Document Solutions Inc., Osaka-shi, Osaka (JP)

(72) Inventor: Bunhaku Chin, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/939,667

(22) Filed: Mar. 29, 2018

(65) Prior Publication Data
US 2018/0288260 A1 Oct. 4, 2018

(30) Foreign Application Priority Data
Mar. 30, 2017 (JP) ................................. 2017-069061

(51) Int. Cl.
*G06K 15/00* (2006.01)
*H04N 1/00* (2006.01)
*G06K 9/00* (2006.01)

(52) U.S. Cl.
CPC ..... *H04N 1/00824* (2013.01); *G06K 9/00463* (2013.01); *H04N 1/00013* (2013.01); *H04N 1/00076* (2013.01); *G06K 2209/501* (2013.01)

(58) Field of Classification Search
CPC .......... G06K 9/00463; G06K 9/00469; G06K 9/00476; G06K 9/00483; G06K 2209/01; H04N 1/00824; H04N 1/00015; H04N 1/00832; H04N 1/00846; H04N 1/00848; H04N 1/00013; H04N 1/00092; H04N 2201/33314; H04N 1/32315; H04N 1/0057; H04N 1/00596
See application file for complete search history.

(56) References Cited

U.S. PATENT DOCUMENTS

| | | | | |
|---|---|---|---|---|
| 5,185,821 A * | 2/1993 | Yoda | ................. | G06K 9/2054 358/403 |
| 2008/0158599 A1* | 7/2008 | Miwa | ................. | G06F 3/1205 358/1.15 |
| 2008/0309957 A1* | 12/2008 | Horiuchi | ............. | G06K 9/3208 358/1.9 |

(Continued)

FOREIGN PATENT DOCUMENTS

JP 09247380 A 9/1997

*Primary Examiner* — Moustapha Diaby
(74) *Attorney, Agent, or Firm* — Alleman Hall Creasman & Tuttle LLP

(57) ABSTRACT

This image forming apparatus includes an image reading portion, an image forming portion, a feature image extraction portion, a continuousness determination portion, and an error notification portion. The feature image extraction portion extracts predetermined feature images from a plurality of respective page image data pieces. The continuousness determination portion determines whether or not each of the feature images of one or more respective target-page image data pieces satisfies a predetermined continuousness condition relative to the feature image of a previous-page image data piece. The error notification portion outputs an error notification including discontinuousness position information indicating one or both of a page-reading turn corresponding to the target-page image data piece determined not to satisfy the continuousness condition, and a turn immediately before the page-reading turn.

4 Claims, 5 Drawing Sheets

(56) References Cited

U.S. PATENT DOCUMENTS

| | | | | |
|---|---|---|---|---|
| 2009/0195826 A1* | 8/2009 | Urakawa | ............ | H04N 1/00204 |
| | | | | 358/1.15 |
| 2009/0251722 A1* | 10/2009 | Kameshima | .......... | G06F 3/1205 |
| | | | | 358/1.15 |
| 2011/0019224 A1* | 1/2011 | Austin | ............... | H04N 1/00005 |
| | | | | 358/1.15 |
| 2012/0013957 A1* | 1/2012 | Honda | ............... | H04N 1/00551 |
| | | | | 358/498 |
| 2012/0185766 A1* | 7/2012 | Mansfield | ............. | G06F 17/212 |
| | | | | 715/246 |

* cited by examiner

IMAGE FORMING APPARATUS

INCORPORATION BY REFERENCE

This application is based upon and claims the benefit of priority from the corresponding Japanese Patent Application No. 2017-069061 filed on Mar. 30, 2017, the entire contents of which are incorporated herein by reference.

BACKGROUND

The present disclosure relates to an image forming apparatus.

In general, an image forming apparatus such as a copy machine or a multifunction peripheral is capable of executing a continuous copy process. The continuous copy process is executed during a period from occurrence of a predetermined start event to occurrence of an end event.

For example, the start event is an event in which a predetermined start operation is performed on an operation portion. The end event is, for example, an event in which a sensor provided to a document sheet tray of an automatic document feeder comes to be in a state of not detecting any document sheet, or an event in which a predetermined end operation is performed on the operation portion.

In the continuous copy process, an image reading portion sequentially reads images of a plurality of pages of document sheets, and sequentially outputs a plurality of page image data pieces indicating the respective images of the document sheets. Then, an image forming portion executes a page printing process of forming, on sheets, the images indicated by the plurality of respective page image data pieces.

In addition, it is known that, in a case where the image reading portion continuously reads an image of the same page of the document sheets during the continuous copy process, the image forming apparatus outputs an alert message and stops the copy process.

SUMMARY

An image forming apparatus according to one aspect of the present disclosure includes an image reading portion, an image forming portion, a feature image extraction portion, a continuousness determination portion, and an error notification portion. The image reading portion is configured to sequentially read images of a plurality of pages of document sheets and sequentially output a plurality of page image data pieces indicating the respective images of the document sheets, during a period from occurrence of a start event to occurrence of an end event. The image forming portion is configured to execute a page printing process of forming, on sheets, the images indicated by the plurality of respective page image data pieces. The feature image extraction portion is configured to extract predetermined feature images from the plurality of respective page image data pieces. The continuousness determination portion is configured to determine whether or not each of the feature images of one or more respective target-page image data pieces, among the plurality of page image data pieces, that are obtained subsequently to the first one thereof satisfies a predetermined continuousness condition relative to the feature image of a previous-page image data piece that is a data piece, among the plurality of page image data pieces, that is obtained immediately before the target-page image data piece. The error notification portion is configured to output an error notification including discontinuousness position information indicating one or both of a page-reading count corresponding to a discontinuous data piece that is the target-page image data piece determined not to satisfy the continuousness condition, and a count immediately before the page-reading count.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. The embodiment described below indicates an exemplary implementation of the present disclosure, and the technical scope of the present disclosure is not limited to the embodiment described below.

[Configuration of Image Forming Apparatus 10]

An image forming apparatus 10 is a device having a copy function, and is, for example, a copy machine, a facsimile apparatus, or a multifunction peripheral.

Figure 1:
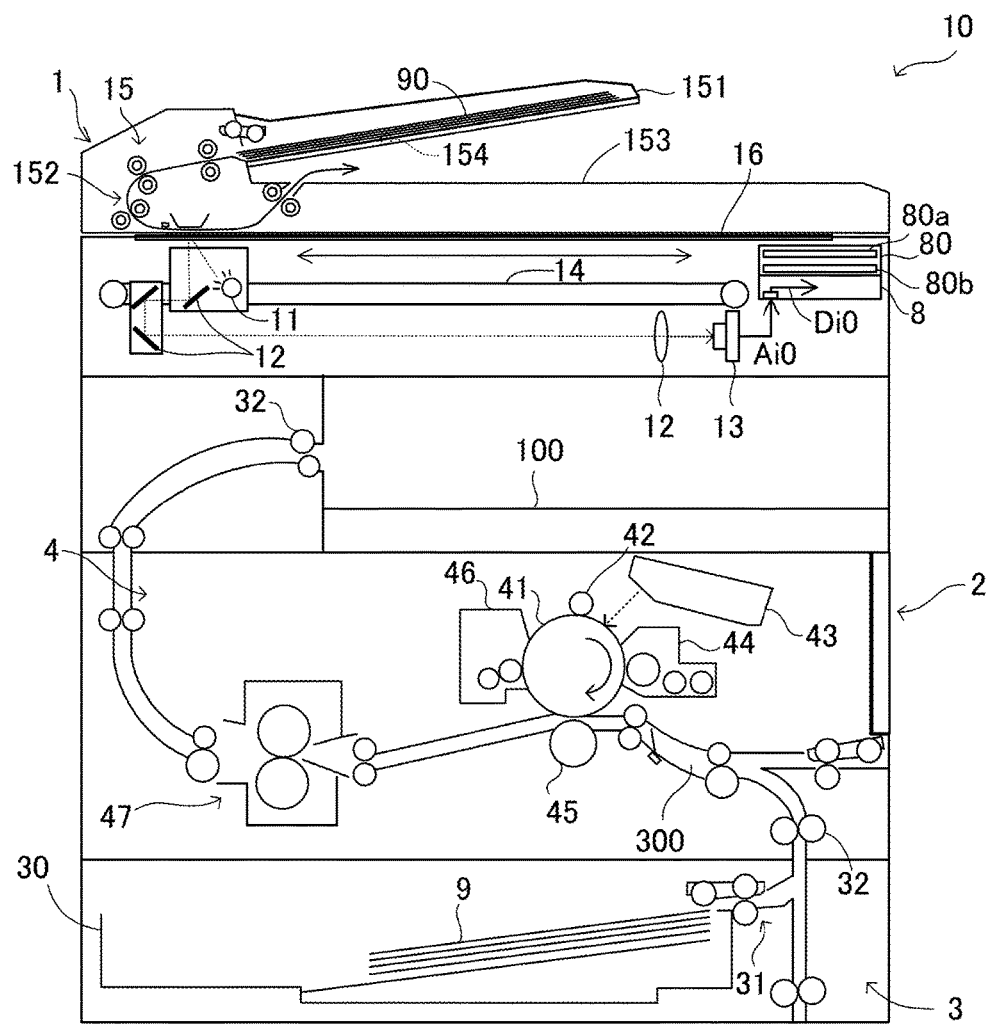
FIG. 1 is a configuration diagram of an image forming apparatus according to an embodiment.

As shown in FIG. 1, the image forming apparatus 10 includes: a body portion 2 including an image forming portion 4; and an image reading portion 1. The image forming apparatus 10 further includes an operation display portion 80 and a control portion 8 common to the image reading portion 1 and the body portion 2. The control portion 8 performs control of the image reading portion 1 and the body portion 2 and other data processing.

[Image Reading Portion 1]

The image reading portion 1 is a device that reads an image of a document sheet 90. The image reading portion 1 includes a light source 11, a light-guiding device 12, and an image sensor 13. The image reading portion 1 shown in FIG. 1 further includes a movably supporting mechanism 14, an ADF (Automatic Document Feeder) 15, and a transparent document sheet table 16. The movably supporting mechanism 14 supports the light source 11 and the light-guiding device 12.

The image reading portion 1 applies light to a document sheet 90 placed on the document sheet table 16 or a document sheet 90 conveyed by the ADF 15, and detects the amount of reflected light from the document sheet 90, thereby reading an image of the document sheet 90.

The light source 11 applies light to a document sheet 90. The light-guiding device 12 includes a mirror and a lens, and guides reflected light from the document sheet 90, to a light-receiving portion of the image sensor 13. The image sensor 13 performs photoelectric conversion of the reflected light from the document sheet 90, thereby outputting an image signal Ai0 indicating the image of the document sheet 90.

The image sensor 13 shown in FIG. 1 is a CCD sensor. The image sensor 13 may be a CIS (Contact Image Sensor) formed so as to be integrated with the light source 11 and the lens.

The ADF 15 picks up document sheets 90, one by one, that are placed on a document sheet supply tray 151, conveys the document sheets 90 along a document sheet conveying path 152, and discharges the document sheets 90 onto a document sheet discharge tray 153.

The ADF 15 includes a document sheet sensor 154 which detects the document sheets 90 on the document sheet supply tray 151. The document sheet sensor 154 may be, for example, a photosensor or a limit switch including an actuator that is displaced due to the weight of the document sheets 90.

In a case where the document sheets 90 are conveyed by the ADF 15, the movably supporting mechanism 14 supports the light source 11 and the light-guiding device 12 in a state where the light source 11 and the light-guiding device 12 are located at predetermined positions. Meanwhile, in a case where a document sheet 90 is placed on the document sheet table 16, the movably supporting mechanism 14 moves the light source 11 and the light-guiding device 12 along the document sheet table 16.

The operation display portion 80 is a user interface. The operation display portion 80 includes: an operation portion 80a including, for example, a touch panel and operation buttons; and a display portion 80b including, for example, a liquid crystal display panel.

The control portion 8 controls various electrical devices included in the image reading portion 1 and the body portion 2, on the basis of input data inputted through the operation portion 80a and detection results from the various sensors. In addition, the control portion 8 also executes: a process of converting, into digital image data Di0, the image signal Ai0 outputted from the image sensor 13; and various image processing on the image data Di0.

An image data piece of one page in the image data Di0 obtained by the image reading portion 1, or an image data piece of one page included in print job data received from another device, is a page image data piece Dp0.

[Body Portion 2]

The body portion 2 includes a sheet supply portion 30, a sheet conveying portion 3, the image forming portion 4, and the like. The image forming portion 4 is a device that forms, on a sheet 9, an image based on the page image data piece Dp0. The image forming portion 4 shown in FIG. 1 electrophotographically forms such an image on the sheet 9. The sheet 9 is a sheet-like image formation medium such as paper or an OHP sheet.

The sheet supply portion 30 is a portion on which the sheet 9 is placed. The sheet conveying portion 3 includes a sheet sending-out mechanism 31 and a sheet conveying mechanism 32. The sheet sending-out mechanism 31 sends out the sheet 9 from the sheet supply portion 30 to a sheet conveying path 300.

The sheet conveying mechanism 32 conveys the sheet 9 along the sheet conveying path 300. Accordingly, the sheet 9 is discharged onto a sheet discharge tray 100 through a discharge port of the sheet conveying path 300 after passing through the image forming portion 4 and a fixing device 47.

The image forming portion 4 forms an image based on the page image data piece Dp0, on the sheet 9 conveyed along the sheet conveying path 300.

The image forming portion 4 includes a drum-like photosensitive member 41, a charging device 42, a laser scanning unit 43, a developing device 44, a transfer device 45, a cleaning device 46, the fixing device 47, and the like. The photosensitive member 41 is one example of an image carrier that carries a toner image.

The photosensitive member 41 is rotated, and the charging device 42 uniformly charges the surface of the photosensitive member 41. The laser scanning unit 43 performs scanning with laser light, thereby writing an electrostatic latent image on the charged surface of the photosensitive member 41. For each page image data piece, the laser scanning unit 43 writes, on the photosensitive member 41, an electrostatic latent image corresponding to an image of one page indicated by the page image data piece.

The developing device 44 develops the electrostatic latent image into a toner image by supplying toner onto the photosensitive member 41. The transfer device 45 transfers the toner image that is on the surface of the photosensitive member 41 onto a sheet 9 that is moving between the photosensitive member 41 and the transfer device 45. Then, the cleaning device 46 removes the toner remaining on the surface of the photosensitive member 41.

The fixing device 47 fixes the toner image on the sheet 9 by heating the toner image on the sheet 9.

Figure 2:
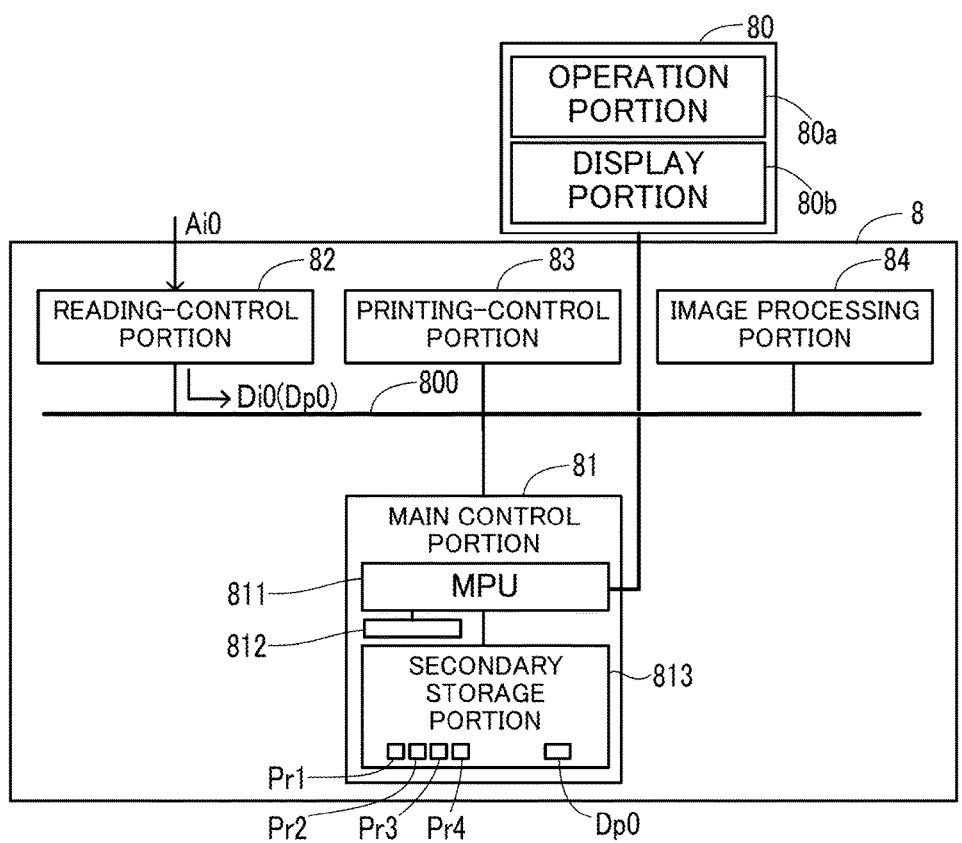
FIG. 2 is a block diagram of a control portion and an operation display portion in the image forming apparatus according to the embodiment.

As shown in FIG. 2, the control portion 8 includes a main control portion 81, a reading-control portion 82, a printing-control portion 83, an image processing portion 84, and the like. The control portion 8 further includes, for example, a communication interface through which data is received from another device and transmitted thereto. For example, the print job data is received from another device through the communication interface.

The main control portion 81, the reading-control portion 82, the printing-control portion 83, and the image processing portion 84 are connected to a bus 800 so that mutual data reception and transmission can be performed via the bus 800.

The reading-control portion 82 controls the image reading portion 1, and acquires the image signal Ai0 from the image reading portion 1. Then, the reading-control portion 82 converts the analog image signal Ai0 into the digital image data Di0, and transfers the image data Di0 to another device such as the image processing portion 84 via the bus 800.

The printing-control portion 83 acquires the page image data piece from the image processing portion 84, and causes the image forming portion 4 to execute a page printing process of forming, on a sheet 9, an image based on the page image data piece.

In addition, in a case where a predetermined copy starting operation is performed on the operation portion 80a in a state where a plurality of the document sheets 90 are placed on the document sheet supply tray 151, the reading-control portion 82 and the printing-control portion 83 cause the image reading portion 1 and the image forming portion 4, respectively, to execute a continuous copy process.

In the continuous copy process, the reading-control portion 82 causes the image reading portion 1 to execute a continuous reading process of sequentially reading images of a plurality of pages of the document sheets 90. Accordingly, the image reading portion 1 sequentially outputs a plurality of the page image data pieces Dp0 indicating respective images of the document sheets 90.

Also in a case where a predetermined continuous-copy starting operation is performed on the operation portion 80a, the reading-control portion 82 and the printing-control portion 83 cause the image reading portion 1 and the image forming portion 4, respectively, to execute the continuous copy process. In this case, a user performs a one-time copy operation on the operation portion 80a each time the user places a document sheet 90 on the document sheet table 16 after a page of the document sheet 90 is selected. Then, each time the one-time copy operation is performed on the operation portion 80a, the reading-control portion 82 and the printing-control portion 83 cause the image reading portion 1 and the image forming portion 4, respectively, to execute a copy process for the one page of the document sheet 90.

Then, in the continuous copy process, the printing-control portion 83 causes the image forming portion 4 to sequentially execute the page printing process of forming, on sheets 9, images indicated by the plurality of the respective page image data pieces Dp0.

The continuous copy process is executed during a period from occurrence of a predetermined start event to occurrence of an end event.

For example, a first start event that is the first example of the start event is an event in which the copy starting operation is performed on the operation portion 80a in a state where the document sheet sensor 154 detects a document sheet 90.

A second start event that is the second example of the start event is an event in which the continuous-copy starting operation is performed on the operation portion 80a in a state where the document sheet sensor 154 does not detect any document sheet 90. In this case, a user performs the one-time copy operation on the operation portion 80a each time the user places a document sheet 90 on the document sheet table 16 after a page of the document sheet 90 is selected.

The end event corresponding to the first start event is an event in which the document sheet sensor 154 comes to a state of not detecting any document sheet 90. Meanwhile, the end event corresponding to the second start event is an event in which a predetermined end operation is performed on the operation portion 80a.

The image processing portion 84 executes various data processing on, for example, the print job data or the image data Di0 obtained from another device via the bus 800. For example, in the continuous copy process, the image processing portion 84 divides the image data Di0 into one or more page image data pieces Dp0, and sequentially transfers the page image data pieces Dp0 to the printing-control portion 83.

The reading-control portion 82, the printing-control portion 83, and the image processing portion 84 are each implemented by, for example, a processor such as a CPU (Central Processing Unit) or a DSP (Digital Signal Processor), or a circuit such as an ASIC (Application Specific Integrated Circuit).

The main control portion 81 comprehensively controls the image forming apparatus 10. The main control portion 81 includes an MPU (Micro Processor Unit) 811, a RAM (Random Access Memory) 812, a secondary storage portion 813, and the like.

The MPU 811 is a processor that executes various calculations and data processing. The RAM 812 is a volatile computer-readable main storage device that temporarily stores a program to be executed by the MPU 811.

The MPU 811 causes the display portion 80b to display various screens such as a notification screen or an operation menu screen. In addition, the MPU 811 outputs control commands to the other control portions in accordance with input information inputted through operation performed on the operation portion 80a and detection results from the various sensors.

In addition, the MPU 811 executes an event detection program Pr1, thereby executing a process of detecting occurrences of the start event and the end event. As described above, the start event and the end event are events indicating timings of start and end of the continuous copy process, respectively.

The secondary storage portion 813 is a non-volatile computer-readable storage device that stores various information that are referred to by the MPU 811. The secondary storage portion 813 may be, for example, a flash memory or a hard disk drive.

The secondary storage portion 813 stores: a program by which the MPU 811 executes various processes; data that is referred to by the MPU 811; and data that is written by the MPU 811.

Incidentally, in the continuous copy process, there may be a case where, for example, the ADF 15 conveys a plurality of document sheets 90 in a stacked state, or a page selection operation for a document sheet 90 to be placed on the document sheet table 16 is incorrectly performed by a user. In this case, there is a risk that the continuous copy process is ended without the user being aware that skip-over in reading of images of some pages of the document sheets 90 has occurred.

The image forming apparatus 10 has a function to prevent the continuous copy process from being ended without any awareness that skip-over in reading of the images of some pages of the document sheets 90 has occurred.

[Continuous Copy Process]

Hereinafter, one example of a procedure of the continuous copy process in the image forming apparatus 10 will be described with reference to the flowchart shown in FIG. 3.

In the description below, S1, S2, . . . indicate identification signs of steps of the continuous copy process. The continuous copy process shown in FIG. 3 is started when the start event occurs.

<Step S1>

When the start event occurs, the reading-control portion 82 causes the image reading portion 1 to execute a page image reading process. The page image reading process is a process of reading an image of one page of document sheets 90. Accordingly, the image reading portion 1 outputs the page image data piece Dp0 to the reading-control portion 82.

For example, in a case where the continuous copy process is started in response to occurrence of the first start event, the reading-control portion 82 causes the light source 11 to be turned on and causes the image sensor 13 to be operated, while causing the ADF 15 to execute a process of conveying one of the document sheets 90.

In a case where the continuous copy process is started in response to occurrence of the second start event, when the one-time copy operation is performed on the operation portion 80a, the reading-control portion 82 causes the light source 11 to be turned on and causes the image sensor 13 to be operated, while causing the movably supporting mechanism 14 to execute a process of moving the light source 11 and the light-guiding device 12 along the document sheet table 16.

The reading-control portion 82 transfers the page image data piece Dp0 acquired from the image reading portion 1, to the main control portion 81 and the image processing portion 84. The main control portion 81 and the image processing portion 84 acquire the page image data piece Dp0 from the image reading portion 1 via the reading-control portion 82.

<Step S2>

Next, the MPU 811 of the main control portion 81 causes the secondary storage portion 813 to store the page image data piece Dp0 acquired from the image reading portion 1. The MPU 811 achieves the process step of step S2 by executing a data management program Pr2.

<Step S3>

Figure 5:
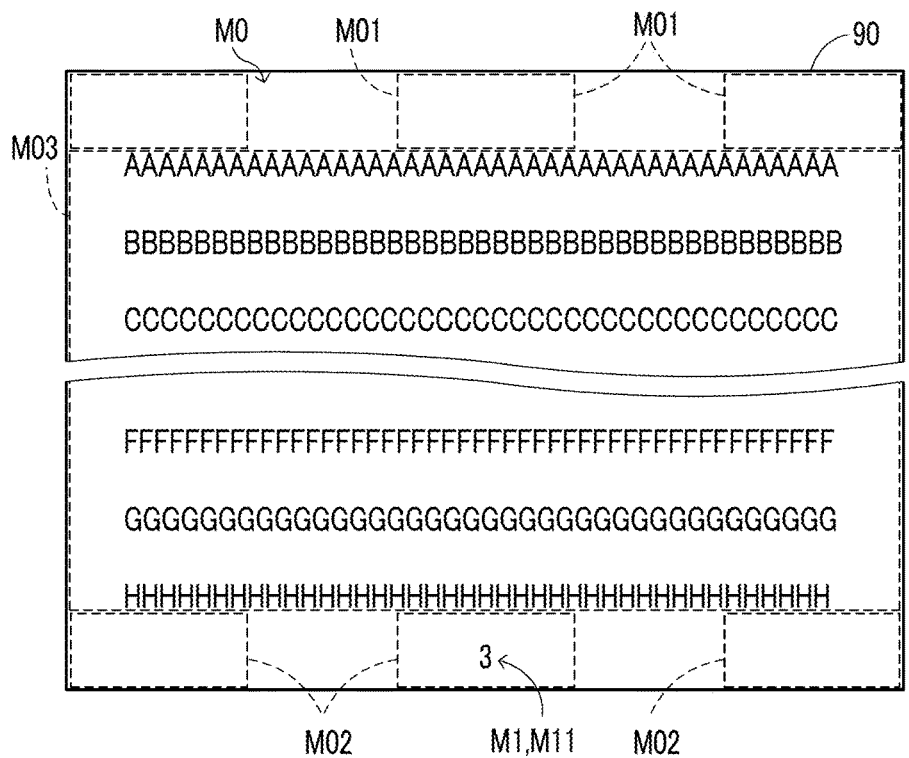
FIG. 5 is a diagram showing an example of a document sheet including a notation of a page number.
Figure 6:
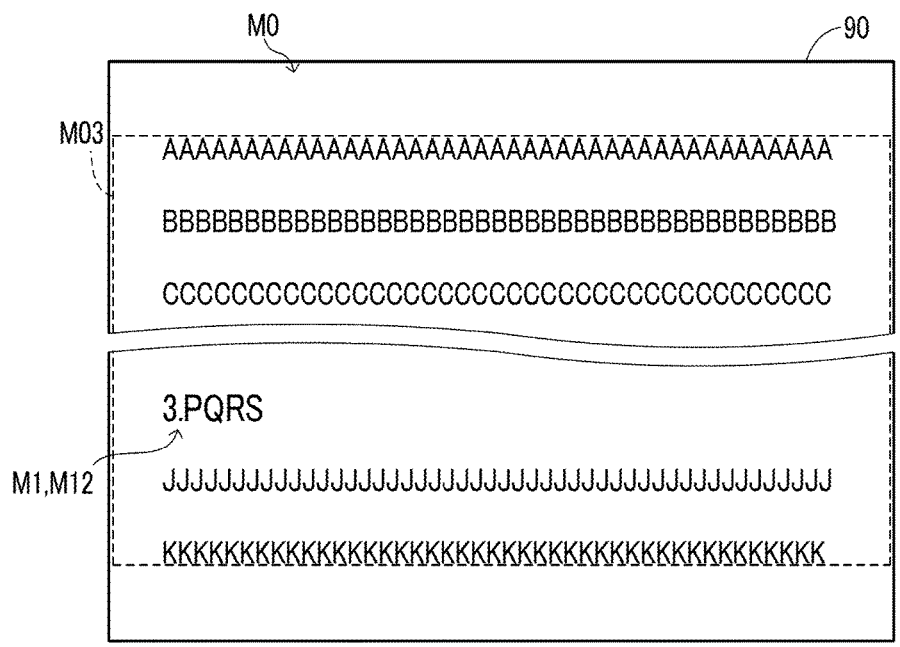
FIG. 6 is a diagram showing an example of a document sheet including a notation of a section number.

In addition, the image processing portion 84 extracts a predetermined feature image M1 from the page image data piece Dp0 acquired from the image reading portion 1 (see FIGS. 5, 6).

As shown in FIG. 5, there may be a case where a page image M0 that is an image of one page formed on the document sheet 90 includes a page number image M11 existing in any of header regions M01 or footer regions M02. In addition, as shown in FIG. 6, there may be also a case where the page image M0 includes a section image M12 indicating a large-size text string that is a text string including a number at the head thereof and having a relatively large size.

In step S3, firstly, the image processing portion 84 executes a first feature image extraction process of extracting the page number image M11 indicating a number, on each of the header regions M0 and each of the footer regions M02 of the page image M0.

Then, in a case where the image processing portion 84 cannot extract any page number image M11 by the first feature image extraction process, the image processing portion 84 executes a second feature image extraction process of extracting the section image M12, on a text body region M03 included in the page image M0 and excluding the header regions M01 and the footer regions M02.

For example, in the first feature image extraction process, the image processing portion 84 identifies the text body region M03 in the page image M0 For example, the image processing portion 84 identifies a plurality of text body lines in the page image M0. Each of the text body lines is a linear region in which the proportion of pixels having a density not lower than a predetermined lower-limit density exceeds a predetermined lower-limit proportion. In addition, the image processing portion 84 identifies, as the text body region M03, the entire region occupied by the plurality of text body lines in the page image M0.

Then, the image processing portion 84 identifies, as the header regions M01, regions that are located in respective three front end regions having predetermined sizes in the page image M0 and that do not overlap with the text body region M03. Similarly, the image processing portion 84 identifies, as the footer regions M02, regions that are located in respective three rear end regions having predetermined sizes in the page image M0 and that do not overlap with the text body region M03.

The three front end regions and the three rear end regions are regions closer to the left end, center regions, and regions closer to the right end in the width direction, respectively.

Then, in the first feature image extraction process, in a case where there is an image that includes pixels having a density not lower than the lower-limit density in any of the header regions M01 and the footer regions M02 of the page image M0, the image processing portion 84 executes a character recognition process on the image, thereby extracting the page number image M11 indicating a number.

Meanwhile, in the second feature image extraction process, the image processing portion 84 executes the character recognition process on an image in the text body region M03, thereby extracting, as the section image M12, an image of a text string including a number at the head thereof and having a relatively large size. The section image M12 is one example of the image of the large-size text string.

Then, the image processing portion 84 sets, as the feature image M1, the section image M12 extracted from a position closer to the last line among the plurality of text body lines in the text body region M03.

<Step S4>

Next, the MPU 811 of the main control portion 81 determines whether or not the page image data piece Dp0 obtained in the most recently performed step S1 is a data piece of the second page or a subsequent page of the document sheets 90. The MPU 811 achieves the process step of step S4 by executing the data management program Pr2.

In the description below, the page image data piece Dp0 of the second page or a subsequent page obtained in the most recently performed step S1 is referred to as a target-page image data piece. A data piece, obtained immediately before the target-page image data piece, among a plurality of the page image data pieces Dp0 obtained in the continuous copy process is referred to as a previous-page image data piece.

In a case where the MPU 811 determines that the page image data piece Dp0 obtained in the most recently performed step S1 is the target-page image data piece, the MPU 811 shifts the process to step S5. In a case where the MPU 811 determines that the page image data piece Dp0 is not the target-page image data piece, MPU 811 shifts the process to step S9.

<Step S5>

In step S5, the MPU 811 executes a continuousness condition determination process. The continuousness condition determination process is a process of determining whether or not a feature image M1 extracted from the target-page image data piece satisfies a predetermined continuousness condition relative to a feature image M1 extracted from the previous-page image data piece.

The MPU 811 achieves the process step of step S5 by executing a condition determination program Pr3. In the present embodiment, the continuousness condition includes a page continuousness condition and a section continuousness condition.

In a case where the feature image M1 extracted in step S3 is the page number image M11, the MPU 811 determines whether or not the feature image M1 satisfies the page continuousness condition. In a case where the feature image M1 extracted in step S3 is the section image M12, the MPU 811 determines whether or not the feature image M1 satisfies the section continuousness condition.

The page continuousness condition is a condition that a page number indicated by a page number image M11 of the previous-page image data piece and a page number indicated by a page number image M11 of the target-page image data piece are continuous.

The section continuousness condition may be, for example, a condition that a number at the head of a text string indicated by a section image M12 of the previous-page image data piece and a number at the head of a text string indicated by a section image M12 of the target-page image data piece are continuous. The text string indicated by the section image M12 is one example of the large-size text string. The section continuousness condition is one example of a large-size number continuousness condition.

There may be also a case where the feature image M1 is not extracted from at least either of the previous-page image data piece and the target-page image data piece. In this case, the MPU 811 determines that the continuousness condition is satisfied. In addition, the determination as to the section continuousness condition may be performed by comparing the target-page image data piece with image data pieces of a plurality of pages obtained most recently relative to the target-page image data piece.

In a case where the MPU 811 determines that the continuousness condition is satisfied, the MPU 811 shifts the process to step S9. In a case where the MPU 811 determines that the continuousness condition is not satisfied, the MPU 811 shifts the process to step S6. In the description below, the target-page image data piece determined not to satisfy the continuousness condition is referred to as a discontinuous data piece.

As described below, in step S9, the image forming portion 4 executes the page printing process of forming, on a sheet 9, an image indicated by the target-page image data piece. The situation where the process steps of steps S6 to S8 are executed, is a situation where the copy process is suspended.

<Step S6>

Figure 4:
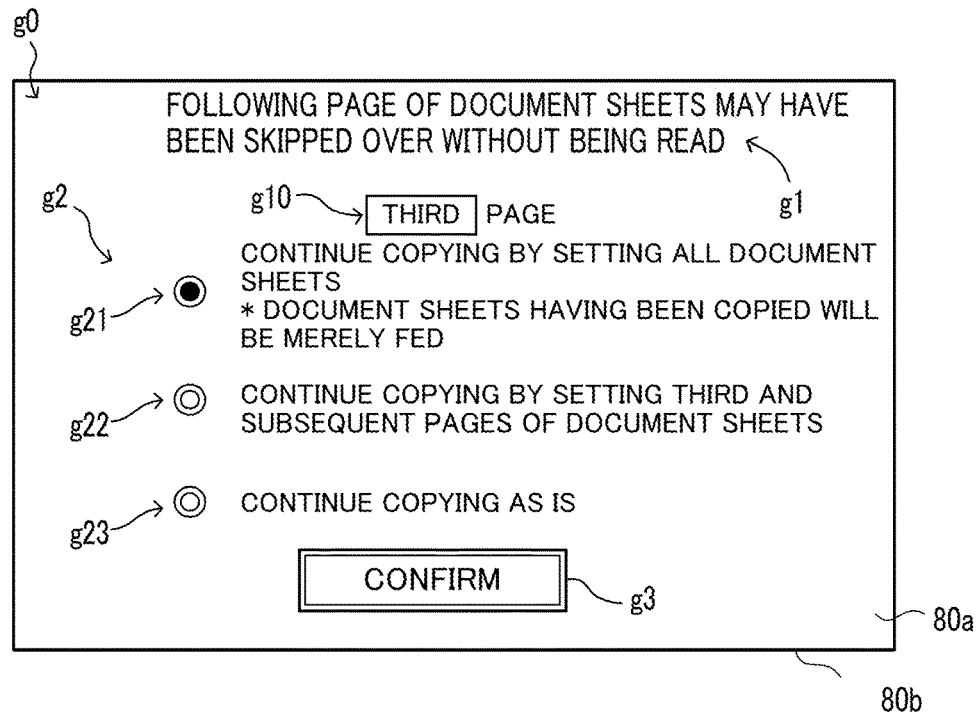
FIG. 4 is a diagram showing an example of a reading-skip-over error notification screen in the image forming apparatus according to the embodiment.

In step S6, the MPU 811 outputs an error notification screen g0 such as one shown in FIG. 4 to the display portion 80b. The MPU 811 achieves the process step of step S6 by executing an error notification program Pr4.

As shown in FIG. 4, the error notification screen g0 includes: an error message g1 indicating that skip-over in reading of a document image has occurred; and discontinuousness position information g10. The discontinuousness position information g10 indicates one or both of: a page-reading count corresponding to the discontinuous data piece; and a count immediately before the page-reading count. The discontinuousness position information g10 shown in FIG. 4 indicates the page-reading count corresponding to the discontinuous data piece.

The error notification screen g0 further includes a copy continuation method selection menu g2. In the example shown in FIG. 4, the copy continuation method selection menu g2 is a menu screen that receives an operation to select a continuation method for the copy process being suspended, from among three options, i.e., a first option g21, a second option g22, and a third option g23.

The first option g21 indicates selecting a method in which the continuous copy process is continued from a state where all of the document sheets 90 are set on the document sheet supply tray 151 again.

The second option g22 indicates selecting a method in which the continuous copy process is continued from a state where document sheets 90 that remain after removing, from all of the document sheets 90, document sheets 90 having been copied are set on the document sheet supply tray 151 again.

The third option g23 indicates selecting a method in which the continuous copy process is continued by ignoring the error notification.

When a confirmation icon g3 of the copy continuation method selection menu g2 is operated after one of the first option g21, the second option g22, and the third option g23 is selected, the MPU 811 selects a process to be subsequently executed, in accordance with the selection result.

That is, the MPU 811 shifts the process to step S8 in a case of selection of the first option g21, shifts the process to step S1 in a case of selection of the second option g22, and shifts the process to step S9 in a case of selection of the third option g23.

In a case of selection of the first option g21, the continuous copy process is restarted for the remaining document sheets 90 other than the document sheets 90 having been copied.

<Step S8>

In step S8, after the reading-control portion 82 causes the ADF 15 to execute a process of merely feeding the document sheets 90 having been copied, the reading-control portion 82 shifts the process to step S1. Accordingly, the continuous copy process is restarted for the remaining document sheets 90 other than the document sheets 90 having been copied.

<Step S9>

In step S9, the printing-control portion 83 causes the image forming portion 4 to execute the page printing process of forming, on a sheet 9, an image indicated by the target-page image data piece obtained in the most recently performed step S1 Thereafter, the printing-control portion 83 shifts the process to step S10.

<Step S10>

In step S10, the MPU 811 deletes, from the secondary storage portion 813, the target-page image data piece having been subjected to the page printing process in the most recently performed step S9. Thereafter, the MPU 811 shifts the process to step S11.

<Step S11>

In step S11, the MPU 811 determines whether or not the end event has occurred. In a case where the MPU 811 determines that the end event has occurred, the MPU 811 ends the continuous copy process. In a case where the MPU 811 determines that the end event has not occurred, the MPU 811 shifts the process to step S1.

As described above, the image reading portion 1 sequentially reads images of the plurality of pages of the document sheets 90 and sequentially outputs the plurality of the page image data pieces Dp0 indicating the respective images of the document sheets 90, during a period from occurrence of the start event to occurrence of the end event (S1).

The image forming portion 4 sequentially executes the page printing process of forming, on sheets 9, the images indicated by the plurality of the respective page image data pieces Dp0 (S9).

The image processing portion 84 extracts the feature images M1 from the plurality of the respective page image data pieces Dp0 (S3). The image processing portion 84 which executes the process step of step S3 is one example of the feature image extraction portion.

The MPU 811 determines whether or not each of feature images M1 of the one or more respective target-page image data pieces, among the plurality of the page image data pieces Dp0, that are obtained subsequently to the first one thereof satisfies the continuousness condition relative to a feature image M1 of the previous-page image data piece among the plurality of the page image data pieces Dp0 (S5). The MPU 811 which executes the process step of step S5 is one example of the continuousness determination portion.

Then, the MPU 811 outputs an error notification including the discontinuousness position information g10 indicating one or both of: a page-reading count corresponding to the discontinuous data piece that is the target-page image data piece determined not to satisfy the continuousness condition; and a count immediately before the page-reading count (S6). The MPU 811 which executes the process step of step S6 is one example of the error notification portion.

As described above, in the continuous copy process, there may be a situation where, for example, the ADF 15 conveys the plurality of document sheets 90 in a stacked state, or a page selection operation for the document sheet 90 to be placed on the document sheet table 16 is incorrectly performed by a user. Such a situation is detected through the continuousness condition determination process by the MPU 811, and the user is notified of the situation in the error notification (S5, S6).

Thus, when the image forming apparatus 10 is used, the continuous copy process is prevented from being ended without the user being aware that skip-over in reading of images of some pages of the document sheets 90 has occurred.

The error notification includes the discontinuousness position information g10 which enables identification of a page on which image skip-over in reading has occurred. Accordingly, the user can easily notice on which page of the document sheets 90 the skip-over in reading has occurred.

In a case where a copy process for a page, of the document sheets 90, on which image skip-over in reading has occurred, is additionally performed after the continuous copy process proceeds to the last page of the document sheets 90, the time and effort as described below are required for the user.

That is, time and effort for the user to insert an additional printed object at a target position between a plurality of printed objects having been copied, are required. The additional printed object is a sheet 9 on which an image of a page, of the document sheets 90, on which image skip-over in reading has occurred, is formed.

Meanwhile, the MPU 811 suspends reading of an image of another document sheet 90 to be performed by the image reading portion 1 (S1) and further execution of the page printing process to be performed by the image forming portion 4 (S9), during a period from a time at which the discontinuous data piece is obtained to a time at which operation to select any one of the three options g21, g22, g23 in the copy continuation method selection menu g2 is performed on the operation portion 80a (S5 to S7).

Then, when the operation to select any one of the three options g21, g22, g23 is performed on the operation portion 80a, the MPU 811 restarts and continues the suspended copy process (S1, S9). The MPU 811 which executes the process steps of steps S3 to S7 is one example of a copy control portion that suspends reading of an image of another document sheet 90 and further execution of the page printing process.

Thus, when the image forming apparatus 10 is used, time and effort for the user to insert an additional printed object at a target position between the plurality of printed objects, are not required.

The operation to select any one of the three options g21, g22, g23 is one example of a copy continuation operation.

[Application Example]

In the continuous copy process performed by the image forming apparatus 10 described above, a feature image M1 and a continuousness condition that are different from those described above may be additionally used.

For example, the feature image M1 of the previous-page image data piece may be an image of a last-row text string in an image of text included in the previous-page image data piece. In this case, the feature image M1 of the target-page image data piece is an image of a top-row text string in an image of text included in the target-page image data piece.

In the description below, the image of the last-row text string and the image of the top-row text string in an image of a page image data piece Dp0 are referred to as a last-row image and a top-row image, respectively.

Figure 3:
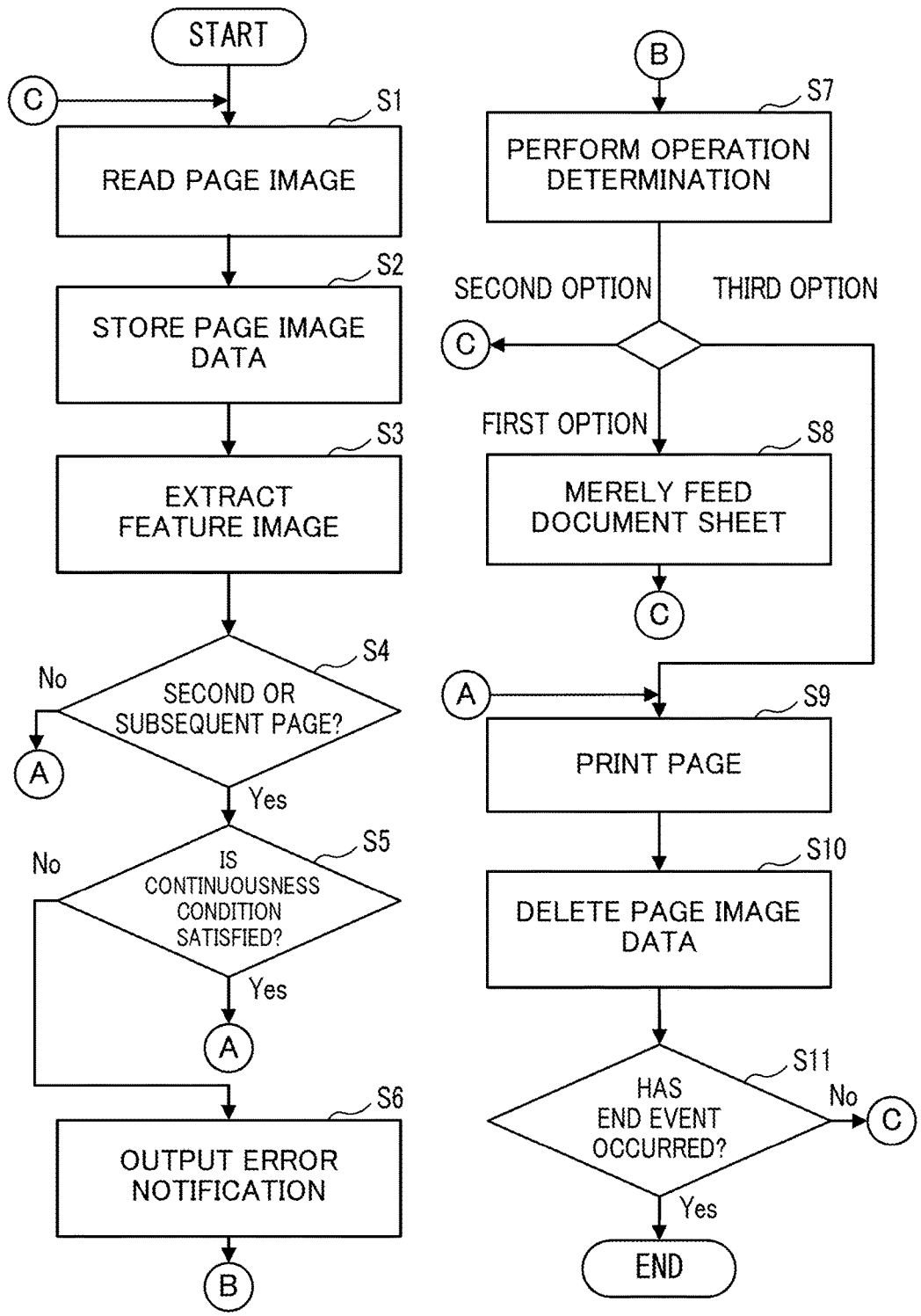
FIG. 3 is a flowchart showing an example of a procedure of a copy process performed in a reading-skip-over check mode in the image forming apparatus according to the embodiment.

In step S3 in FIG. 3, in a case where the image processing portion 84 cannot extract a page number image M11 or a section image M12, the image processing portion 84 extracts the top-row image and the last-row image in the target-page image data piece. At this time, the image processing portion 84 extracts the top-row image as a feature image M1 of the previous-page image data piece in a next-page copy process. In addition, the image processing portion 84 extracts the last-row image as a feature image M1 of the target-page image data piece.

For example, the image processing portion 84 identifies the range of the top-row image by executing the character recognition process on an image of a region, of the text body region M03, that is closer to the front end. Similarly, the image processing portion 84 identifies the range of the last-row image by executing the character recognition process on an image of a region, of the text body region M03, that is closer to the last line.

Then, in a case where the last-row image is extracted as the feature image M1, the MPU 811 determines in step S5 in FIG. 3 whether or not a one-sentence continuousness condition as one example of the continuousness condition is satisfied.

The one-sentence continuousness condition is a condition that the last-row text string indicated by a feature image M1 of the previous-page image data piece does not include any full stop at the end of the text string, and the top-row text string indicated by a feature image M1 of the target-page image data piece is a text string that does not indicate start of any sentence.

As one example of the text string that indicates start of a sentence, a text string in which a character at the head of one line is indented from the head positions of the other lines, may be considered.

In addition, in a case where the language of the last-row text string and the top-row text string is English, as another example of the text string that indicates start of a sentence, a text string including a capital character at the head thereof may be considered. For example, the language of a text string included in the page image M0 may be set in advance in accordance with operation performed on the operation portion 80a.

The image forming apparatus according to the present disclosure can also be configured by freely combining the embodiment and application examples described above, or modifying or partially omitting the embodiment and application examples as appropriate, within the scope of the disclosure recited in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
    an image reading device configured to execute a continuous reading process of sequentially reading images of a plurality of pages of document sheets and sequentially outputting a plurality of page image data pieces indicating the respective images of the document sheets, during a period from occurrence of a start event to occurrence of an end event;

an image forming device configured to execute a page printing process of forming, on sheets, the images indicated by the plurality of respective page image data pieces obtained by the continuous reading process; and a processor configured to:

extract predetermined feature images from the plurality of respective page image data pieces;

determine whether or not each of the feature images of one or more respective target-page image data pieces, among the plurality of page image data pieces, that are obtained subsequently to a first one thereof satisfies a predetermined continuousness condition relative to the feature image of a previous-page image data piece that is a data piece, among the plurality of page image data pieces, that is obtained immediately before the target-page image data piece;

output an error notification including discontinuousness position information indicating at least one of a page-reading count corresponding to a discontinuous data piece that is the target-page image data piece determined not to satisfy the continuousness condition, and a count immediately before the page-reading count;

suspend reading of an image of another document sheet and further execution of the page printing process during a period from a time at which the discontinuous data piece is obtained to a time at which a copy continuation operation is performed;

output, to a display device, a menu screen that receives an operation to select a continuation method for a process being suspended, from among a first option, a second option, and a third option, the first option indicating that a continuous copy process that includes the continuous reading process and the page printing process is continued from a state where all of the document sheets are set on the image reading device again, the second option indicating that the continuous copy process is continued from a state where document sheets that remain after removing, from all of the document sheets, document sheets having been copied are set on the image reading device again, the third option indicating that the continuous copy process is continued by ignoring the error notification;

in a case of selection of the first option, cause the image reading device to execute a process of feeding document sheets that have been copied, and cause the image reading device and the image forming device to execute the continuous copy process;

in a case of selection of the second option, cause the image reading device and the image forming device to execute the continuous copy process; and in a case of selection of the third option, cause the image forming device to execute a process of forming, on sheets, an image indicated by a previous-page image data piece obtained most recently, and cause the image reading device and the image forming device to execute the continuous copy process.

2. The image forming apparatus according to claim 1, wherein the feature image is an image indicating a page number existing in a header region or a footer region in each of the plurality of page image data pieces, and the continuousness condition includes a page continuousness condition that the page number indicated by the feature image of the previous-page image data piece and the page number indicated by the feature image of the target-page image data piece are continuous.

3. The image forming apparatus according to claim 1, wherein the feature image is an image of a large-size text string that is a text string including a number at a head thereof and having a relatively large size, and the continuousness condition includes a large-size number continuousness condition that a number at a head of the large-size text string indicated by the feature image of the previous-page image data piece and a number at a head of the large-size text string indicated by the feature image of the target-page image data piece are continuous.

4. The image forming apparatus according to claim 1, wherein the feature image of the previous-page image data piece is an image of a last-row text string in an image of text included in the previous-page image data piece, the feature image of the target-page image data piece is an image of a top-row text string in an image of text included in the target-page image data piece, and the continuousness condition includes a one-sentence continuousness condition that the last-row text string indicated by the feature image of the previous-page image data piece does not include any full stop at an end of the text string, and the top-row text string indicated by the feature image of the target-page image data piece is a text string that does not indicate start of any sentence.

* * * * *